United States Patent Office 3,560,537
Patented Feb. 2, 1971

3,560,537
PROCESS FOR PRODUCING STRAIGHT CHAIN MONOBASIC CARBOXYLIC ACID SOAPS AND THEIR DERIVATIVES
William R. Eller, Greenwell Springs, La., assignor to Ethyl Corporation, New York, N.Y.
No Drawing. Continuation-in-part of application Ser. No. 567,361, July 25, 1966, which is a continuation-in-part of application Ser. No. 530,403, Feb. 28, 1966. This application Nov. 8, 1968, Ser. No. 774,484
Int. Cl. C08h 17/36
U.S. Cl. 260—413                                22 Claims

ABSTRACT OF THE DISCLOSURE

Normal alcohols having from about 6 to about 30 carbon atoms per molecule are selectively reacted with alkali metal hydroxide when in the presence of less reactive branched primary alcohols to produce carboxylic acid soaps of predominantly straight chain carbon skeletal configuration and also to produce hydrogen. The selectivity of reaction of straight chain alcohols and freedom from methylene group attack is enhanced by using proper elevated temperatures in combination with a deficiency of alkali metal hydroxide based on stoichiometric proportions for the total alcohol content of the reaction system and in the absence of oxidants for methylene groups at the temperatures involved. The soaps are usable as such or as synthesis intermediates for derivatives such as corresponding acids.

CROSS REFERENCE TO RELATED APPLICATIONS

This application is a continuation-in-part of application Ser. No. 567,361, filed July 25, 1966 entitled "Chemical Process," now abandoned, which application is a continuation-in-part of application Ser. No. 530,403, filed Feb. 28, 1966 entitled "Chemical Process," now abandoned.

BACKGROUND OF THE INVENTION

Field of the invention

This invention relates to the preparation of hydrogen and of synthetic monobasic carboxylic acid soaps and their derivatives having a straight chain structure free of branching of the carbon skeleton. In greater particularity, it relates to the production of soaps having a straight carbon skeleton through processes involving selective caustic fusion of alkanol mixtures containing alkanols with branched carbon skeleton as well as alkanols with straight chain skeleton.

DESCRIPTION OF THE PRIOR ART

The production of "normal" or "straight-chain" synthetic monobasic carboxylic acid soaps having from about 6 to about 30 carbon atoms per molecule is an item of considerable commercial significance since such materials are important for the preparation of numerous end products which are in widespread commercial use. A typical example of the use of such soaps is in the washing soap and detergent industry; however, there, as with most applications for such synthetics, the commercial requirement is almost exclusively for materials that duplicate certain naturally derived materials which have gained usage history and type acceptance through the years. A particularly important source of naturally derived materials is coconut oil which upon saponification provides soaps of a wide range of molecular weights from which acids can be obtained by acidification, or as is more likely, used directly as soaps or converted to alkanols by processing involving hydrogenation. Significant characteristics of acids and soaps obtained through the use of coconut oil include (1) a high proportion of saturated materials in the molecular weight range corresponding to 12–16 carbon atoms per molecule which provides particularly desirable soap and detergent properties, (2) straight chain molecular structure free or branching or of associated tertiary carbon atoms, and (3) "even" number of carbon atoms in the molecules, particularly those of adjacent even number carbon atoms. Of these characteristics perhaps the most evasive and difficult to obtain at low cost in synthetics is the exclusively straight chain structure. Proportions and selectivity to molecules of "even" carbon atom content can be obtained through distillation where costs can be controlled and markets found for the materials removed; however, the avoidance of formation of branched materials or their removal from straight chain acids and soaps is difficult.

A significant potential source of low cost soaps and acids is the oxo process. Low cost alcohols can be produced this way and the caustic fusion of such alcohols to produce soaps is the subject of a large part of the patent literature in the field of acids. Unfortunately, however, the oxo process is not selective. For one reason or another there is always a significant production of branched alcohols or aldehydes due to the addition of carbon monoxide occurring at carbon atoms other than alpha carbon atoms. Also mixed isomeric olefins having "odd" and "even" numbers of carbon atoms per molecule generally must be used to achieve low cost feed stock because the boiling point spread of isomeric olefins does not contribute to easy distillation separation. Thus alcohols having an odd number of carbon atoms per molecule as well as "evens" result from the oxo process. Under extremely favorable conditions the branching can be held as low as about 15 percent of the product molecules present with some of the newer catalyst systems; however, as commercially performed the product branching is usually much greater, ranging up to about 50 percent of the product alcohols. The 15 percent figure may appear small; however, it is a particularly offensive minority since branching even in trace amounts is generally a nonnatural characteristic and is usually associated with objectionable odors and poor bio-degradability in soap products derived therefrom.

Even in other synthetic alcohol processes which are normally considered as producing only normal alcohols, such as the Ziegler aluminum chemistry process of U.S. Pat. 2,892,858 involving chain growth on lower aluminum alkyls to produce higher aluminum alkyls, oxidation of the higher alkyls to corresponding trialkoxy aluminum compounds and then hydrolysis to corresponding alcohols, some branched alcohols are produced. The quantity of such is small, typically 1–4 percent; however, critical users of soaps or derivatives such as acids are frequently so particular that they are willing to pay premium prices for materials that have even a smaller percentage of branched components.

Accordingly, it is an object of the present invention to provide a process whereby oxo derived materials and others possessing even small quantities of branched molecules can be converted into soaps and their derivatives, particularly acids, with selectivity wherein the conversion is virtually limited or at least is enhanced significantly to that of straight chain molecules, the branched molecules present remaining as non-saponifiables readily separable from the converted acids or soaps by simple processes.

Another object of the present invention is to provide a process whereby synthetic alcohols containing some branched alcohol molecules can be converted to soaps on a selective basis wherein the branched alcohol molecules are virtually non-reactive, and the system is free of tendencies toward methylene group

oxidation.

Other and further objects and features of the present invention will become apparent upon a careful consideration of the following discussion.

SUMMARY

In accordance with the fundamental teachings of the present invention, a process is provided for producing straight chain soaps and acids from low cost synthetic material, particularly synthetically derived alcohols or the like, wherein the production of soaps and acids having branched molecular structure is avoided to a significant extent. The branching problem is reduced by a large factor by employing alcohol-to-soap caustic fusion conversion under conditions which attain a heretofore unrealized high degree of selectivity of reaction of the straight structure molecules in the presence of branched alcohol molecules which are virtually non-reactive to produce soaps. Another important aspect is avoidance of oxidation at methylene groups.

The present selective caustic fusion operation is a unique manipulation in which the temperature of reaction, the proportions of reactants and the composition of co-present materials are controlled to secure a new result, avoiding the need for catalysts added to the system and the use of oxidizing agents that are prone to the production of methylene group attacks. Freedom from methylene group attack is enhanced by the presence in the system of by-product hydrogen which provides valuable economic advantage as well. Although such by-product hydrogen is generated in situ in the operation, residual or added hydrogen or some inert gas is useful in instances wherein the presence of hydrogen or inert gas from the start is desired.

What is perhaps the best current commercial practice with regard to the caustic fusion of oxo alcohols is shown by U.S. Pat. 2,926,182. This process employs comparatively high temperatures such as 360° C. and excess caustic such as 10–50 percent excess above stoichiometric despite problems connected with such as regards materials of construction and decomposition of organic materials. Presumably such high temperatures and large excesses of caustic are regarded by the prior art as necessary for completion of reaction where significant quantities of branched alcohols are present, there being no apparent effort to obtain anything short of highest possible conversion of everything to acids or soaps so that the percentage of branched molecules in the acids or soaps is the same as in the starting alcohol.

In contrast to this prior art, it has been discovered that with temperatures milder by a small amount to spread the reactivity, and preferably with stoichiometric caustic based on the straight chain materials present, there is realizable differential reactivity of straight chain primary alcohols and branched chain primary alcohols so that the alcohols that react first are those of normal configuration, leaving the branched alcohols virtually unreacted; or at least not converted to acid soaps. As the reaction starts, free hydrogen is liberated thus in this sense substantially the entire reaction is conducted in the presence of hydrogen. One could charge hydrogen to the system; however, usually there is no need to do so. Gaseous hydrogen is thus a co-product of the process and is available in excellent purity. This hydrogen is readily recovered so that the process actually produces hydrogen as a potentially valuable product.

It will be understood and appreciated that the mixture of alcohol and alkali metal hydroxide fed to the system may be heated to temperature directly or may be subjected to a pretreatment prior to reacting the mixture at the elevated temperatures as described in application S.N. 766,959, filed Oct. 11, 1968, by Robert J. Fanning, entitled Chemical Process.

Although the present process is usable with various individual alcohols and with alcohol mixtures having from about 6 to about 30 carbon atoms per molecule, a preferred feed is a mixture of intermediate molecular weight alcohols of the following composition:

| Alcohol: | Wt. percent |
|---|---|
| Dodecanol | 50–80 |
| Tetradecanol | 10–40 |
| Hexadecanol | 0–10 |
| Mixed miscellaneous alcohols including isomers | 0–10 |

Such alcohol is a combination of straight and branched chain primary alcohol components.

A more preferred feed is a mixture of primary alcohols of the following composition:

| Alcohol: | Wt. percent |
|---|---|
| Dodecanol | 65 |
| Tetradecanol | 25 |
| Hexadecanol | 6 |
| Mixed isomers (branched) | 4 |
| | 100 |

Another typical feed is a mixture of primary alcohols ranging from about 16 to about 24 carbon atoms per molecule, predominating in 16 and 18 carbon atom components.

Typical branched alcohols of the foregoing are predominantly of the types: 2-ethyl, 2-propyl; 2-butyl, 3-ethyl; 3-propyl; 3-butyl, 4-ethyl, 4-propyl, 4-butyl, etc. branched.

Another typical feed is an oxo alcohol product having mixed branched and normal alcohols ranging from about 50 to about 90 percent normal alcohols, the branched alcohols being predominantly "2-methyl" branched.

Preferred alcohol is a combination of straight and branched chain primary alcohol components having from about 6 to about 16 carbon atoms per molecule. The products from processing such are particularly desirable for use in producing esters and detergent materials.

Even more preferred alcohol is a combination of straight and branched chain primary alcohol components in which each alcohol present in the mixture has an even number of carbon atoms per molecule. Particularly is this true with regard to the straight chain primary alcohol components.

Still more preferred alcohol is a combination of a homologous series of straight and branched chain primary alcohol components having a plurality of adjacent even number carbon atoms. Such preferred combinations as this are typified by the dodecanol, tetradecanol and hexadecanol mixtures of the foregoing compositions listed.

For the greatest selectivity, the preferred alcohol contains branched chain primary alcohol components of comparatively low reactivity, particularly those in which the branched components have a branch in the 2, 3 or 4 position, said branch containing at least two carbon atoms. These alcohols when in combination with usual straight alcohols such as those having approximately the same total numbers of carbon atoms per molecule as the branched chain alcohols provide materially lower reaction rates than the straight chain alcohols. A particularly preferred type of branching has a two carbon atom branch in the 2 position, viz, 2-ethyl type of alcohols.

For the foregoing selectivity and high conversion, it appears highly advantageous and desirable to perform the fusion reaction at a temperature from about 240° C. up to about 340° C., preferably from 300° C. up to about 340° C. with an even narrower range of about 320° to about 335° C. preferred, particularly 330° C. The higher region, say about 330° C., is preferred from a rate viewpoint; however, temperatures above about 340° usually result in excessive destruction of the alcohol molecules where yields of 95 percent and higher are desired. It is surprising that the selectivity of reaction of normal alcohols relative to branched alcohols with NaOH appears to be significantly better at 330° C. than at 300° C., a fact which leads to the belief that the melting point of the caustic may be a more significant factor in this connection than was previously suspected. At temperatures below 300° C., viscosity increases magnify the difficulty of securing good contact between materials as well as the foaming problem which is inherent in this operation because of the release of hydrogen. A preference for 330° C. is shown where maximum selectivity is desired.

The other important consideration set forth above for selectivity of reaction is proportioning of reactants. For some reason which is not altogether clear except seeking conversion of all alcohols present that are not destroyed by the high temperature, it appears that prior art caustic fusion is generally conducted with an excess of caustic, even up to 50 percent excess. Materials of construction problems are particularly severe with such an excess of caustic at the temperatures involved and side reactions come into prominence such as the reaction of soap and caustic to produce paraffin and (sodium) carbonate. Thus with a combination of such conditions with high temperatures of the order of 370° C. still being preferred by the prior art, one would expect the existence of compelling reasons to use such severe conditions and to avoid lower temperatures as well as an excess of alcohol.

Speculation as to high concentrations of caustic and of high temperatures being chosen by prior art for yield optimization encounter problems because overall yields of 90–92 percent were considered high in prior art whereas with the present process yields of straight chain soaps and acids of 95 percent are commonplace and yields of 97 percent and higher are attainable. With conversions that are so high, the recycle of unconverted alcohol is generally unnecessary and comparatively simple separation thereof is practical.

It has been discovered that excellent selective fusion of straight chain alcohols is obtianed with the specified temperatures and stoichiometry and that alcohol losses and soap destruction can be held extremely low, particularly at high temperatures when methylene group oxidation can be avoided. Although a slight excess of straight chain alcohol appears to improve selectivity of reaction of the straight chain alcohol, such is not absolutely essential for significant valuable selectivity. Large excesses of normal alcohol relative to the amount of caustic provided are in general undesired also because they result in reductions in the yield of product soaps per pass and virtually dictate the use of effective separation and recycle techniques. As a practical matter, it is generally preferred to use an amount of caustic which corresponds about to the normal alcohol content of the feed material on a molar basis. In this way the normal alcohols react at a much higher rate than the branched alcohols so for all practical purposes the caustic is virtually consumed on straight chain alcohol and is unavailable for subsequent reaction of the branched alcohols. Various caustic materials used in prior art caustic fusion are in general suitable. Preferred caustic materials because of reactivity and cost considerations are the hydroxides of metals of Groups I–A and II–A having atomic numbers of 3 to 56, both inclusive. (Fisher Scientific Co. 1955 Chart.) Particularly desirable are the hydroxides of the Group I–A metals because the soaps produced therefrom are water soluble; however, others can have benefit through modification of the properties of the Group I–A materials. Of these caustic materials, sodium hydroxide and potassium hydroxide are preferred on a cost-effectiveness basis whereas sodium hydroxide is the most preferred in this regard.

Desirable results are obtainable with a ratio of straight chain alcohol to caustic ranging from about 1:1 (molar) to about 1.25:1 (25 percent excess alcohol), the former ratio preferred for optimum conversion of alcohol, the latter preferable for selectivity, with a preferred range being from about 1:1 to about 1.10:1. Generally, the higher ratios of alcohol to caustic will be preferred at lower temperatures and the lower ratios at the higher temperatures.

Optimum temperatures for selectivity are in general different for the different caustic materials involved. With lithium hydroxide the preferred temperature ranges are somewhat lower than with sodium hydroxide. In all cases, however, the preferred temperature will be significantly below that normally preferred for the most advanced prior art non-selective caustic fusion of oxo and similar alcohols. A temperature of 330° C. is particularly effective for selectivity of many NaOH containing mixtures.

Under conditions such as the foregoing, particularly the preferred conditions of stoichiometry and temperatures, the apparently more reactive straight chain alcohols monopolize the available caustic so that for the most part the only soaps obtained from the caustic fusion reaction are soaps of straight chain structure. The branched alcohols remain in the unsaponifiables and are readily separable either by solvent extraction or with stripping as with nitrogen or steam at 60° C. to 310° C., preferably with steam at the higher temperatures.

Such unsaponifiables can be handled in several ways. As an example, they can be disposed of as alcohols in non-critical uses, they can be oxidized to acid, or they can be subjected to a second stage of caustic fusion under somewhat more severe conditions approaching those of U.S. Pat. 2,926,182 whereby branched soaps and acids are produced for non-critical uses such as lubricants.

Although the soaps thus produced have significant direct utility themselves, high quality product acids are obtainable from the straight chain soaps by acidification as with a dilute mineral acid such as HCl or sulfuric acid. These product acids are quite low in branched acid content and even with oxo type feed alcohols, they are found to be acceptable substitutes for naturally derived normal acids in many moderately critical situations that could not previously use acids derived from oxo alcohols by caustic fusion. These acids contain minor branching (less than 2 percent) even when using oxo alcohol feeds with 20 percent or more branching and they include components having an odd number of carbon atoms per molecule. Where the feed alcohols are aluminum chemistry derived having a very low branched content to begin with, the product soaps and acids are generally appreciably better than those derived from coconut oil by normal processing thereof.

DESCRIPTION OF THE PREFERRED EMBODIMENTS

Example I

A mixture of 0.18 mole of 2-methyl dodecanol and 0.18 mole of n-tetradecanol was heated at 300° C. in a well-stirred, 250-ml. "Magne-Drive" autoclave with 0.15 mole of powdered reagent-grade anhydrous sodium hydroxide. Evolved hydrogen was allowed to escape through a pressure-control valve which maintained a constant pressure of 175–200 p.s.i.g. When hydrogen evolution ceased, the reactor was cooled and the contents (essentially a mixture of unreacted straight-chain and branched alcohols plus sodium soaps of straight-chain and branched carboxylic acids) were cooled and weighed.

An aliquot of the product mixture was charged into a 250-ml. blender with 150–175 ml. of pentane and a weighed portion of n-decane. After thorough blending, a small sample of the pentane extract was injected directly into a gas chromatograph. The weights of unreacted straight-chain and branched alcohols in the product mixture were then calculated, using the n-decane peak as an internal standard and calibration factors measured previously for the pure straight-chain and branched alcohols. The blender contents (pentane extract plus mixture of straight-chain and branched soaps) were filtered, and the solid filter cake (soap mixture) was dried and dissolved in 100–125 ml. of water. The filtrate (pentane extract) was washed with water and the aqueous washings were added to the dissolved filter cake. The resulting aqueous soap solution was acidified, and the resulting mixture of straight-chain and branched carboxylic acids was washed with water, dried, weighed, esterified with diazomethane, and analyzed as the methyl esters by gas chromatography, again using calibration factors previously measured for the pure compounds. These techniques permitted calculation of independent material balances for straight-chain and for branched products. In a number of experiments of this type, these material balances were consistently above 92 percent and averaged about 95 percent.

On the assumption (established by independent kinetic studies) that the caustic dehydrogenation is first order in alcohol concentration, a relative rate constant was defined as the ratio of the dehydrogenation rate for the straight-chain alcohol to the dehydrogenation rate for the branched alcohol and calculated from the expression:

$$r = \text{Relative Rate} = \frac{\log\ (a'/a'_0)}{\log\ (a/a_0)}$$

where $a_0$ and $a$ are the initial and final concentrations of straight-chain alcohol respectively, and $a'_0$ and $a'$ are the initial and final concentrations of branched alcohol respectively. For this experiment, these calculations gave $r=5.69$.

Example II

Example I was repeated, except that the temperature for the dehydrogenation reaction was 330° C. instead of 300° C. For this exptriment, $r$ was found to be 7.35.

Example III

Examples I and II were repeated, using a different alcohol mixture consisting of equal parts of 2-ethyl dodecanol and n-dodecanol and same reactant stoichiometry. The relative rate at 300° C. was $r=6.94$ and at 330° C. was 17.11.

Example IV

Examples I and II were again repeated, using a mixture of equal parts of 2-butyl decanol and n-tetradecanol and the same reactant stoichiometry. At 300° C., $r=13.53$ and at 330° C., $r=17.58$.

Example V

Examples I and II were again repeated, using a mixture of equal parts of 3-methyl nonanol and n-dodecanol and the same reactant stoichiometry. At 300° C., $r=4.21$ and at 330° C., $r=5.22$.

Example VI

Examples I and II were again repeated, using a mixture of equal parts of 3-propyl undecanol and n-dodecanol and the same reactant stoichiometry. At 300° C., $r=9.67$ and at 330° C., $r=14.87$.

Example VII

Examples I and II are repeated using various alcohols having from 6 to 30 carbon atoms per molecule in various combinations of normal-branched and of normal low molecular weight-normal of high molecular weight and of branched low molecular weight-branched high molecular weight. Comparable results are obtained; however, the hydrogen evolution rate in general decreases as the molecular weight of feed alcohols increases and the branched mixtures in general require higher temperatures than the normal alcohols.

I claim:
1. A process for producing predominantly straight chain unsubstituted monobasic carboxylic acid soaps having from about six to about thirty carbon atoms per molecule from a mixture consisting essentially of alkanol and alkali metal hydroxide wherein the alkanol feed is a mixture of straight and branched chain primary alkanol components having from about 6 to about 30 carbon atoms per molecule, which process comprises
  selectively reacting the straight chain primary alkanol in said mixture at an elevated temperature of about 300° C. to about 340° C., the molar proportion of the straight chain primary alkanol content of said feed mixture realtive to the alkali metal hydroxide being from about 1:1 to about 1.25:1; and
  recovering the soaps produced.
2. The process of claim 1 wherein hydrogen is recovered as a co-product.
3. The process of claim 1 wherein said alkali metal hydroxide is sodium hydroxide or potassium hydroxide.
4. The process of claim 1 wherein said alkanol is a combination of straight and branched chain primary alkanol components having from about 6 to about 16 carbon atoms per molecule.
5. The process of claim 4 wherein said alkanol is a combination of straight and branched chain primary alkanol components in which each alkanol present in the mixture has an even number of carbon atoms per molecule.
6. The process of claim 4 wherein said alkanol is a combination of homologous series straight and branched chain primary alkanol components having a plurality of adjacent even number carbon atoms.
7. The process of claim 1 wherein said alkanol is a combination of straight and branched chain primary alkanol components in which the branched components have a branch in the 2, 3 or 4 position, said branch containing at least two carbon atoms.
8. The process of claim 1 wherein said alkanol is a combination of straight and branched chain primary alkanol components having from about 6 to about 16 carbon atoms per molecule and said alkali metal hydroxide is sodium hydroxide.
9. The process of claim 8 wherein said alkanol is a combination of straight and branched chain primary alkanol components in which each alkanol present in the mixture has an even number of carbon atoms per molecule and said alkali metal hydroxide is sodium hydroxide.
10. The process of claim 8 wherein said alkanol is a combination of homologous series straight and branched chain primary alkanol components having a plurality of adjacent even number carbon atoms and said alkali metal hydroxide is sodium hydroxide.
11. The process of claim 1 wherein said alkanol is a combination of straight and branched chain primary alkanol components in which the branched components have a branch in the 2, 3 or 4 position, said branch containing at least two carbon atoms and said alkali metal hydroxide is sodium hydroxide.
12. The process of claim 1 wherein said alkanol is a combination of straight and branched chain primary alkanol components having from about 6 to about 16 carbon atoms per molecule and said alkali metal hydroxide is sodium hydroxide and the temperature is from about 300 to about 340° C.
13. The process of claim 12 wherein said alkanol is a combination of straight and branched chain primary alkanol components in which each alkanol present in the mixture has an even number of carbon atoms per molecue and said alkali metal hydroxide is sodium hydroxide and the temperature is from about 300 to about 340° C.
14. The process of claim 12 wherein said alkanol is a combination of straight and branched chain primary alkanol components having a plurality of adjacent even number carbon atoms and said alkali metal hydroxide is sodium hydroxide and the temperature is from about 300 to about 340° C.

15. The process of claim 1 wherein said alkanol is a combination of straight and branched chain primary alkanol components in which the branched component has a branch in the 2, 3 or 4 position, said branch containing at least two carbon atoms and said alkali metal hydroxide is sodium hydroxide and the temperature is from about 300 to about 340° C.

16. The process of claim 15 wherein said alkanol is a combination of straight and branched chain primary alkanol components in which the branched component is predominantly 2-ethyl alkanol and said alkali metal hydroxide is sodium hydroxide and the temperature is from about 300 to about 340° C.

17. The process of claim 1 wherein the temperature is from about 320 to about 335° C. and the alkali metal hydroxide is sodium hydroxide.

18. The process of claim 1 wherein the temperature is about 330° C. and the alkali metal hydroxide is sodium hydroxide.

19. The process of claim 1 wherein the proportioning of the alkanol and alkali metal hydroxide provides a stoichiometric excess of alkanol relative to alkali metal hydroxide based on the straight chain primary alkanol content of the alkanol mixture in the feed.

20. The process of claim 1 wherein the proportioning of the feed alkanol and alkali metal hydroxide provides a stoichiometric excess of straight chain alkanol relative to alkali metal hydroxide present of from about 1 to about 25 percent on a molar basis.

21. The process of claim 1 wherein the proportioning of the feed alkanol and alakali metal hydroxide provides a stoichiometric excess of straight chain alkanol relative to alkali metal hydroxide present of from about 1 to about 10 percent on a molar basis.

22. The process of claim 1 wherein the proportioning of the feed alkanol and alkali metal hydroxide provides a stoichiometric excess of straight chain alkanol relative to alkali metal hydroxide present of about 10 percent on a molar basis.

References Cited

UNITED STATES PATENTS

| 2,926,182 | 2/1960 | Sutton | 260—413 |
| 3,370,074 | 2/1968 | Dimond et al. | 260—413 |

LEWIS GOTTS, Primary Examiner

E. G. LOVE, Assistant Examiner

U.S. Cl. X.R.

260—531

PO-1050
(5/69)

UNITED STATES PATENT OFFICE
CERTIFICATE OF CORRECTION

Patent No. 3,560,537          Dated February 2, 1971

Inventor(s) William R. Eller

It is certified that error appears in the above-identified patent and that said Letters Patent are hereby corrected as shown below:

Column 1, line 6, after "N.Y.", insert -- a corporation of Virginia --. Column 5, line 44, reads "obtianed", should read -- obtained --. Column 7, lines 29 and 30, reads $\frac{\log(a'/a'_o)}{\log(a/a_o)}$, should read $\frac{\log(a/a_o)}{\log(a'/a'_o)}$ ;

line 40, reads "exptriment", should read -- experiment --. Column 8, line 14, reads "realtive", should read -- relative Column 10, line 7, reads "alakali", should read -- alkali --

Signed and sealed this 13th day of July 1971.

(SEAL)
Attest:

EDWARD M. FLETCHER, JR.
Attesting Officer

WILLIAM E. SCHUYLER, JR.
Commissioner of Patents